(12) United States Patent
Onishi

(10) Patent No.: US 7,669,247 B2
(45) Date of Patent: Feb. 23, 2010

(54) CONTENT PROCESSING APPARATUS

(75) Inventor: Yoshisumi Onishi, Osaka (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 733 days.

(21) Appl. No.: 11/357,440

(22) Filed: Feb. 21, 2006

(65) Prior Publication Data

US 2007/0101441 A1 May 3, 2007

(30) Foreign Application Priority Data

Feb. 24, 2005 (JP) ............... 2005-048129

(51) Int. Cl.
*G06F 17/30* (2006.01)
*H04N 7/16* (2006.01)
(52) U.S. Cl. .......................... 726/33; 726/30
(58) Field of Classification Search .................. 726/30, 726/33
See application file for complete search history.

(56) References Cited

U.S. PATENT DOCUMENTS

| 6,807,641 | B1 * | 10/2004 | Ishiguro et al. ................. 714/6 |
| 7,028,127 | B2 * | 4/2006 | Kang et al. .................. 710/303 |
| 7,092,911 | B2 * | 8/2006 | Yokota et al. ................. 705/57 |
| 7,243,241 | B1 * | 7/2007 | Katsumata et al. .......... 713/193 |
| 7,487,225 | B2 * | 2/2009 | Nishibe et al. .............. 709/219 |
| 2002/0064096 | A1 * | 5/2002 | Ukita et al. .................... 368/66 |
| 2002/0186960 | A1 * | 12/2002 | Hatanaka ...................... 386/94 |
| 2004/0022391 | A1 * | 2/2004 | O'Brien ...................... 380/281 |
| 2004/0179691 | A1 * | 9/2004 | Hori et al. .................... 380/277 |
| 2005/0223083 | A1 * | 10/2005 | Muraki ....................... 709/219 |
| 2006/0020637 | A1 * | 1/2006 | Kedem ........................ 707/200 |

FOREIGN PATENT DOCUMENTS

| JP | 09-204360 A | 5/1997 |
| JP | 2004-118929 | 4/2004 |
| JP | 2004-038519 A | 5/2004 |
| JP | 2005-292959 A | 10/2005 |
| JP | 2006-195629 A | 7/2006 |

* cited by examiner

*Primary Examiner*—Michael Pyzocha
(74) *Attorney, Agent, or Firm*—Westerman, Hattori, Daniels & Adrian, LLP

(57) ABSTRACT

A content processing apparatus includes an MCU. The MCU determines whether or not an audio file exists in a flash memory when a USB connection operation is detected. If the determination result is affirmative, the audio file recorded on the flash memory is erased, and a USB connection process is executed. That is, the audio file recorded on the flash memory is erased between a time when the USB connection operation is performed and a time when the USB connection is established.

18 Claims, 4 Drawing Sheets

CONTENT PROCESSING APPARATUS

CROSS REFERENCE OF RELATED APPLICATION

The disclosure of Japanese Patent Application No. 2005-48129 is incorporated herein by reference.

BACKGROUND OF THE INVENTION

1. Field of the Invention

The present invention relates to a content processing apparatus. More specifically, the present invention relates to a content processing apparatus which is connected to a personal computer (PC), receives a content from the PC, records the received content on a recording medium, and processes the content recorded on the recording medium.

2. Description of the Related Art

Conventionally, such a kind of apparatus is USB-connected to a PC, receives a music content from the PC, records the received music content on a memory card, and reproduces the music content recorded on the memory card. It should be noted that the music content is recorded on the memory card in a file format such as an MP3, a WMA (Windows Media® Audio), an AAC, etc.

If the aforementioned conventional apparatus is USB-connected to other PC, the music content within the memory card can easily be fetched in the other PC. That is, by utilizing the conventional apparatus, an unauthorized copy of a music content can be easily performed. It should be noted that in a part of file formats such as a WMA, etc., a copy control can be performed by a DRM (Digital Rights Management) while in many file formats such as an MP3, etc. such a copy control cannot be performed.

SUMMARY OF THE INVENTION

Therefore, it is a primary aspect of the present invention to provide a novel content processing apparatus.

Another aspect of the present invention is to provide a content processing apparatus capable of preventing an unauthorized copy of a content.

According to a preferred embodiment, a content processing apparatus (10) comprises an establisher for establishing a connection with a desired apparatus when a connection operation is performed, a determiner for determining whether or not a content is recorded on a recording medium, an erasure for erasing the content recorded on the recording medium between a time when the connection operation is performed and a time when the establishing process by the establisher is completed when a determination result by the determiner is affirmative, a receiver for receiving a content from the desired apparatus after the establishment operation by the establisher is completed, and a recorder for recording the content received by the receiver in the recording medium.

When a connection operation is performed, a connection is established with a desired apparatus by an establisher. Whether or not a content exists in the recording medium is determined by a determiner. If the determination result of the determiner is affirmative, the content recorded on the recording medium is erased by an erasure from the performance of the connection operation to the completion of the establishment process by the establisher. A receiver receives a content from the desired apparatus after the establishment operation by the establisher is completed. The received content is recorded on the recording medium by a recorder.

Thus, if a connection operation is performed in a state that the content is recorded on the recording medium, the content on the recording medium is erased before a connection with the desired apparatus is established. Thus, it is possible to prevent an unauthorized copy of the content.

Also, the erasing process time period is from execution of the USB connection operation to establishment of the USB connection, and therefore, a content received from the desired apparatus after the connection is established continues to exist in the recording medium until a next USB connection operation is performed. Thus, it is possible to appreciate the content in the recording medium.

In addition, a content processing apparatus further comprises a reproducer for reproducing the content recorded on the recording medium.

The content recorded on the recording medium is reproduced by a reproducer.

Further, a content processing apparatus further comprises an eliminator for eliminating a copy allowable content out of the content recorded on the recording medium from an object to be erased by the erasure.

The copy allowable content out of the content recorded on the recording medium is eliminated from an object to be erased by the eliminator.

The copy allowable content continues to exist in the recording medium 12 even after the connection operation is performed, and therefore, it is possible to save the trouble of frequently recording the same audio file. Specifically, a once-off copy allowable content is erased from the desired apparatus at a time when it is recorded on the recording medium, and therefore, it is possible to prevent the content from being erased from the recording medium and from being unappreciated.

Then, the eliminator excludes an encrypted content.

The encrypted content is freed from being erased by an erasure as a copy allowable one.

Further, the eliminator eliminates a content to which copy control information is added.

The content to which copy control information is added is freed from being erased by an erasure as a copy allowable one.

Further, the recording medium is a built-in type.

It is possible to make efficient use of limited storage capacity.

According to the preferred embodiments, it is possible to prevent an unauthorized copy of the content.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
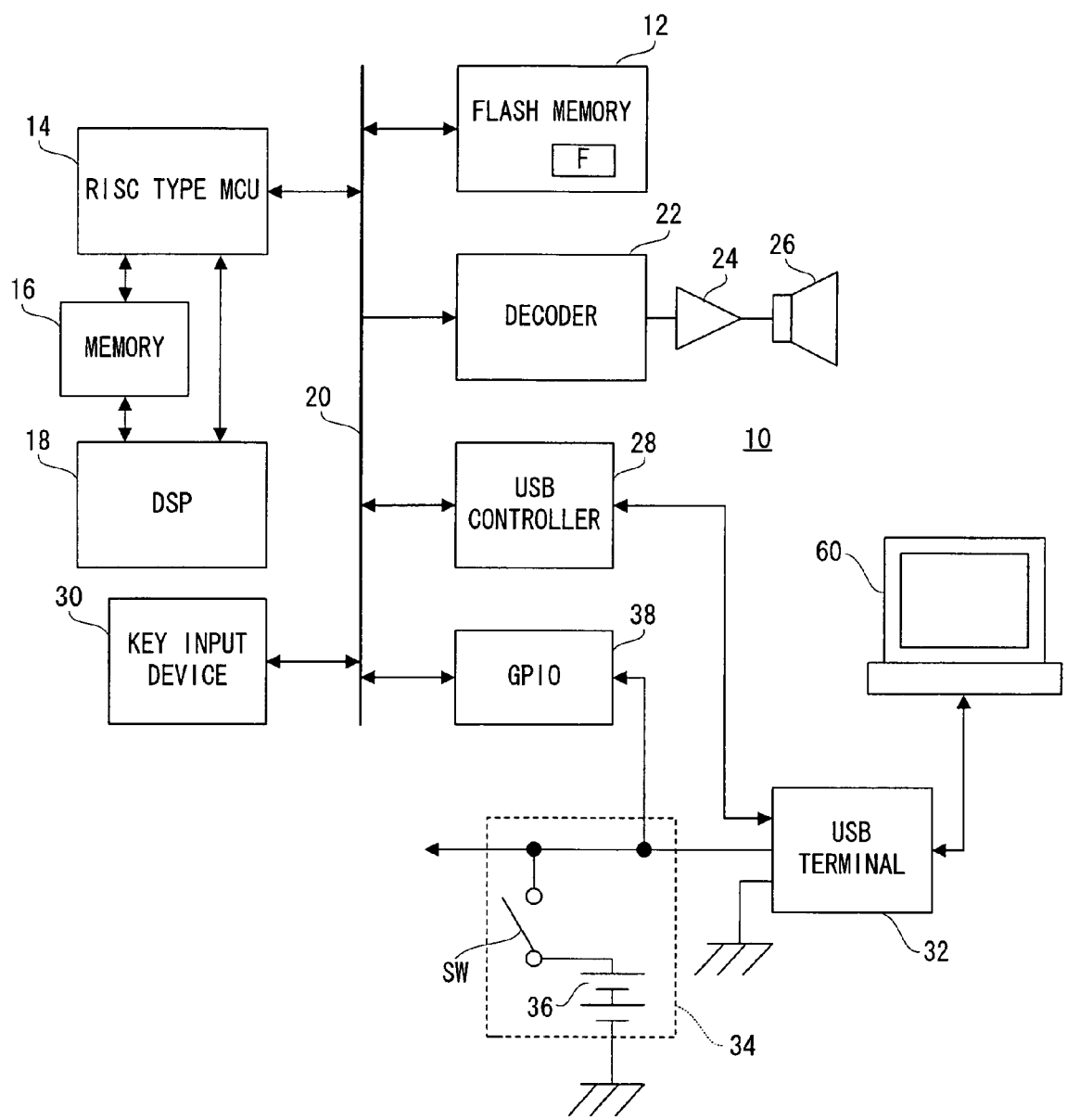
FIG. 1 is a block diagram showing a configuration of one embodiment of the present invention.

Referring to FIG. 1, an IC recorder 10 of this embodiment includes an USB terminal 32. The USB terminal 32 is connected to a USB terminal (not illustrated) of a PC 60 via a USB cable. The IC recorder 10 realizes an audio recording function by working with the PC 60 in a state of being USB-connected to the PC 60. Also, the IC recorder 10 separately realizes an audio reproducing function. It should be noted that an audio file recorded/reproduced by the IC recorder 10 complies with a WMA format.

Figure 2:
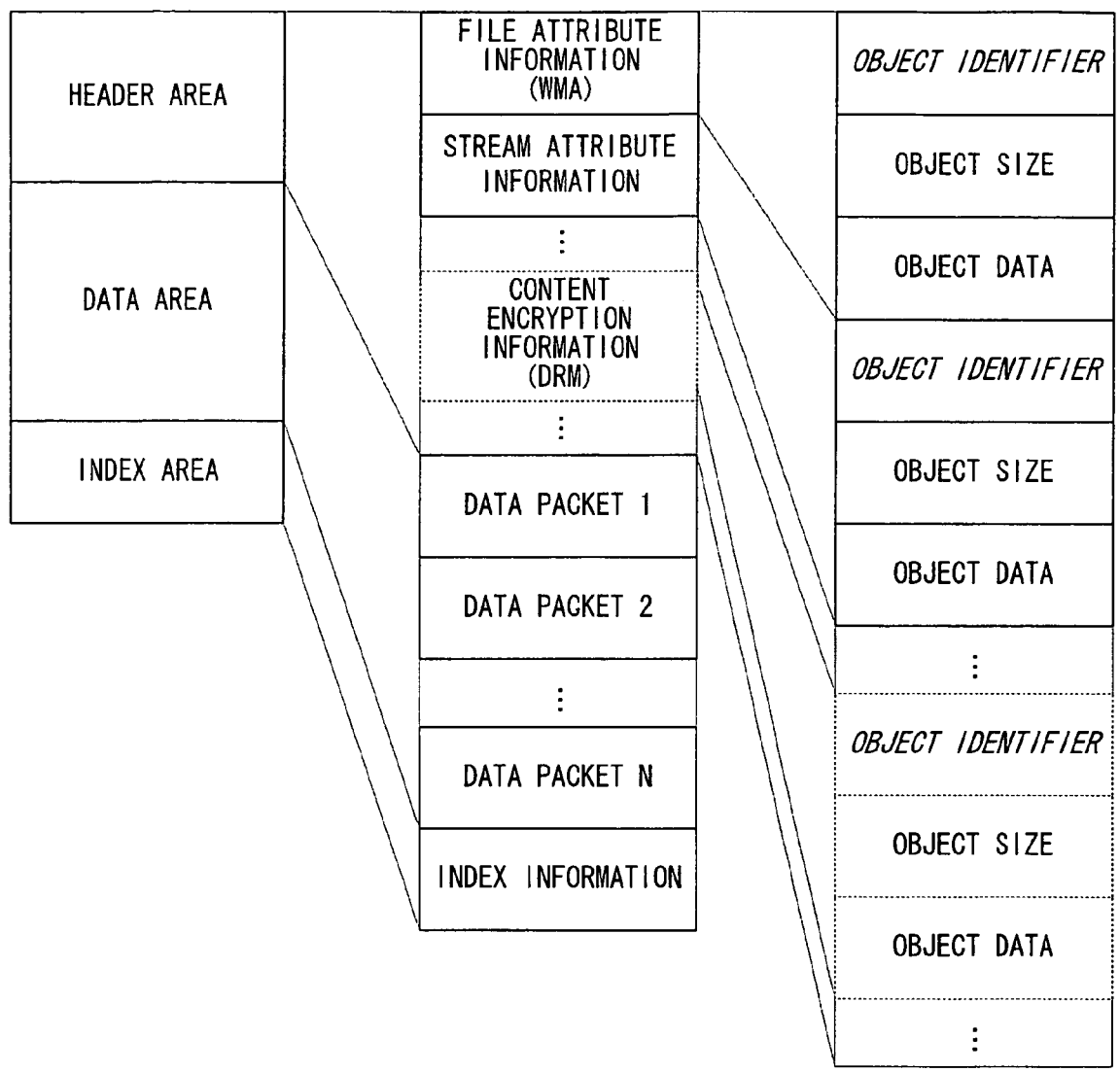
FIG. 2 is an illustrative view showing a file structure applied to FIG. 1 embodiment.

A WMA file structure is shown in FIG. 2. With referring to FIG. 2, the WMA file includes a header area, a data area, and an index area. In the header area are stored file attribute information, stream attribute information, etc., in the data area are stored N data packets, and in the index area is stored index information. Especially, for a WMA file on which a copy control by a DRM is performed, copy control information and content encryption information are additionally stored in the header area.

The information on the header area, that is, each of the file attribute information, the stream attribute information, and the content encryption information comprise an object identifier, an object size, and object data. Thus, if an object identifier within the header area is searched, what kind of information is stored in the header area can be informed, and this makes it possible to inform a file format and the presence or absence of a copy control.

Returning to FIG. 1, when a power supply switch (not illustrated) provided on a power supply circuit 34 is turned on in a state that the IC recorder 10 is not connected to the PC 60, that is, in a USB unconnected state, the switch SW shifts from a turn-off state to a turn-on state, and a direct voltage of a battery 36 is provided to an entire system.

If a reproducing operation is performed by a key input device 30 in an USB unconnected state, a RISC type MCU 14 sets a DSP 18 to an expansion mode, and reads an audio file stored in a flash memory 12 through a bus 20. The read audio file is applied to the DSP 18 through a memory 16. The DSP 18 expands compressed audio data included in the applied audio file, and accumulates the expanded audio data in the memory 16.

The MCU 14 applies the audio data accumulated in the memory 16 to a decoder 22 through the bus 20. The decoder 22 decodes the applied audio data into an analog audio signal, and outputs the decoded audio signal from a speaker 26 through an amplifier 24. Thus, an audio reproducing function is realized.

When the IC recorder 10 is connected to the PC 60 by the USB terminal 32 to shift the switch SW from the on-state to the off-state, a USB bus power voltage (direct voltage) is supplied from the PC 60 to the entire system through the USB terminal 32. A GPIO 38 detects variation (L level→H level) of the USB bus power voltage, and informs the MCU 14 of the fact via the bus 20.

When receiving a notification from the GPIO 38, that is, detecting a USB connection operation, the MCU 14 first executes a file erasing process. In the file erasing process, a following series of processes is performed on each of files stored in the flash memory 12. That is, the MCU 14 searches an object identifier within the header area, determines whether or not the file is an object to be erased on the basis of the search result, and erases the file if the determination result is affirmative.

Consequently, a file about which an object identifier corresponding to the WMA (see FIG. 2) is not detected is freed from being erased as a non-audio file. Furthermore, a file about which the object identifier corresponding to the DRM or the object identifier corresponding to the content encryption information (see FIG. 2) is detected is excluded from the object to be erased as a copy allowable audio file. The file except for these is entirely erased from the flash memory 12.

After such a file erasing process, the MCU 14 executes a USB connection process to thereby establish a USB connection. When the USB connection is established, the MCU 14 informs the PC 60 the mode information "recording mode" through the USB controller 28 and the USB terminal 32. In response thereto, the PC 60 displays a music selection screen (not illustrated), accepts a selecting operation, and sends the compressed audio data corresponding to the selected music.

The compressed audio data sent from the PC 60 is applied to the MCU 14 through the USB terminal 32 and the USB controller 28. The MCU 14 accumulates the applied compressed audio data in the memory 16. The MCU 14 records the compressed audio data accumulated in the memory 16 in the flash memory 12 in a file format. Thus, the audio recording function is realized.

After the audio file is recorded on the flash memory 12, when a USB disconnection operation is performed, a direct voltage of the battery 36 is supplied to the entire system again to bring about a USB unconnected state. When a reproducing operation is performed by the key input device 30 in this state, the audio file in the flash memory 12 is reproduced similarly to the above description. Thereafter, when the IC recorder 10 is connected to the PC 60 again, the audio file in the flash memory 12 is erased in a similar manner.

Figure 3:
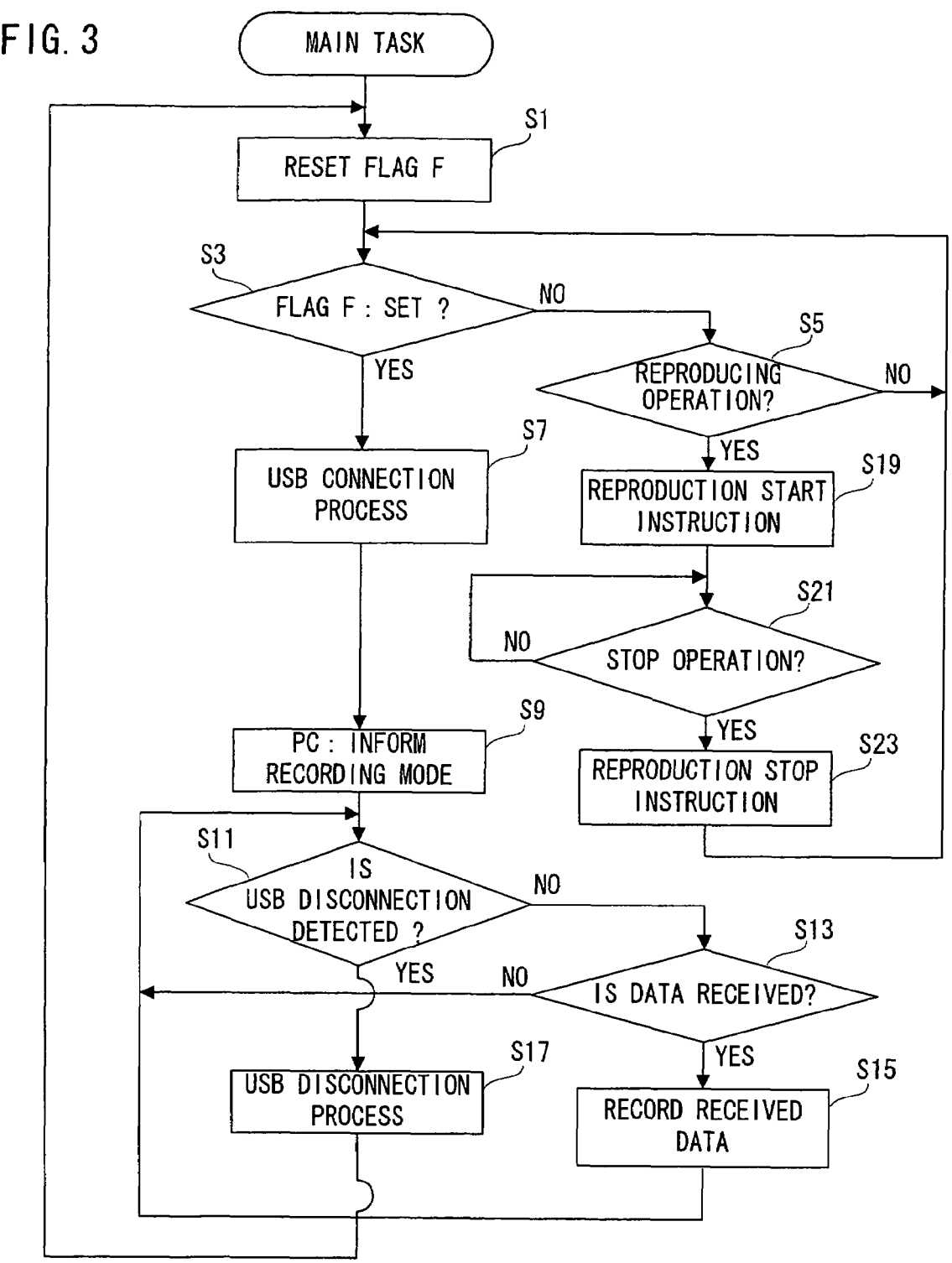
FIG. 3 is a flowchart showing a part of an operation of a CPU applied to FIG. 1 embodiment.
Figure 4:
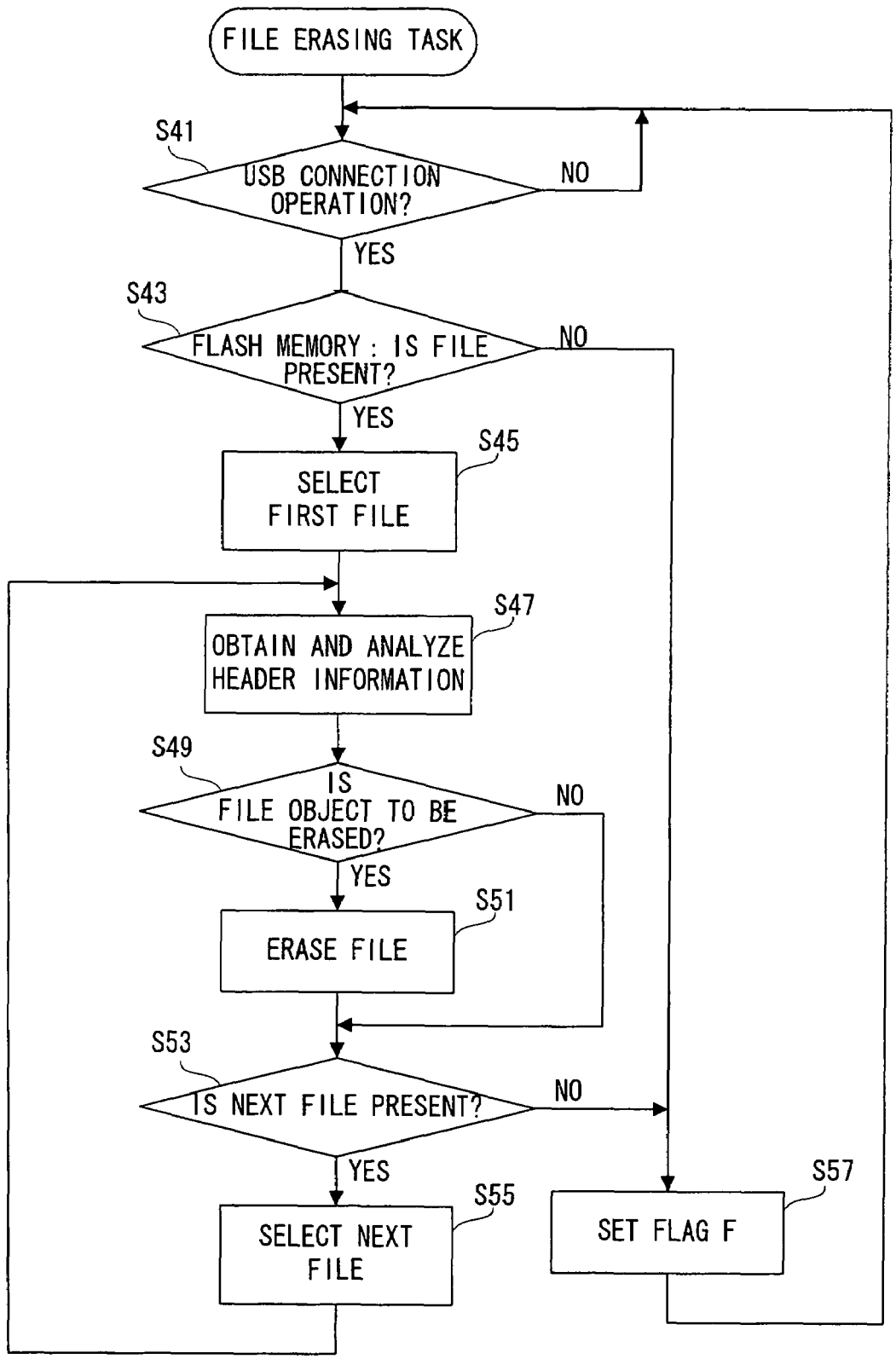
FIG. 4 is a flowchart showing another part of the operation of the CPU applied to FIG. 1 embodiment.

The MCU 14 executes a main task shown in FIG. 3 and a file erasing task shown in FIG. 4 in parallel under a multitasking OS such as μITRON, etc. It should be noted that these tasks are started in response to a power-on operation, and ended in response to a power-off operation. The control program corresponding to these flowcharts is stored in the flash memory 12.

Referring to FIG. 3, in a step S1, a flag F is first reset, and then, the process enter a loop in steps S3 and S5. In the step S3, it is determined whether or not the flag F is set, and in the step S5, it is determined whether or not a reproducing operation is performed. When the flag F is set by the file erasing task, "YES" is determined in the step S3, and the process shifts to a step S7. In the step S7, a USB connection process is executed, and after completion of the process, the PC 60 is notified of the "recording mode" in a step S9. Next, the process enters the loop in steps S11 and S13.

In the step S11, it is determined whether or not a USB disconnection operation is performed, and in the step S13, it is determined whether or not the data from the PC 60 is received by the USB controller 28. When the data is received, "YES" is determined in the step S13, and the process shifts to a step S15 to record the received data in the flash memory 12. Then, the process returns to the loop in the steps S11 and S13.

When the USB disconnection operation is performed, "YES" is determined in the step S11, and the process shifts to a step S17. In the step S17, a USB disconnection process is executed, and then, the process returns to the step S1.

When a reproducing operation is performed in the USB unconnected state, "YES" is determined in the step S5, and the process shifts to a step S19. In the step S19, the DSP 18 and the decoder 22 are instructed to start reproducing. In a next step S21, it is determined whether or not a stop operation is performed. If the determination result is negative, a standby state is held. If the determination result in the step S21 is affirmative, the process shifts to a step S23 to instruct the DSP 18 and the decoder 22 to stop reproducing. Thereafter, the process returns to the loop in the steps S3 and S5.

Referring to FIG. 4, in a step S41, it is determined whether or not a USB connection operation is performed. If the determination result is negative, a standby state is held. When the determination result in the step S41 is affirmative, the process shifts to a step S43 to determine whether or not a file exists in the flash memory 12. If the determination result is negative in the step S43, the process proceeds to a step S57 to set the flag F, and returns to the step S41.

If the determination result in the step S43 is affirmative, a first file is selected in a step S45. In a next step S47, information is obtained from a header area of the selected file, and the obtained information is analyzed. More specifically, by searching an object identifier included in the obtained information, a file format and the presence or absence of the copy control are determined.

In a next step S49, it is determined whether or not the selected file is an object to be erased on the basis of the analysis result, and if the determination result is affirmative, the selected file is erased in a step S51. More specifically, if the object identifier corresponding to the WMA is not detected, the selected file is a non-audio file, and therefore, it is determined that the file is not an object to be erased, and the file is freed from being erased. If the object identifier corresponding to the WMA, and the object identifier corresponding to the DRM or the object identifier corresponding to the content encryption information are detected, the selected file is a copy controlled audio file, and therefore, it is determined that the file is not an object to be erased, and the file is freed from being erased. The file except for these is determined to be an object to be erased, and is erased from the flash memory 12. Thereafter, the process proceeds to a step S53.

If the determination result in the step S49 is negative, the process in the step S51 is skipped, and the process proceeds to the step S53. In the step S53, it is determined whether or not a next file exists in the flash memory 12. If the determination result is affirmative, the next file is selected in a step S55. Then, the process returns to the step S47.

If the determination result in the step S53 is negative, the process shifts to a step S57 to set the flag F, and then, the process returns to the step S41.

As understood from the above description, in this embodiment, when detecting a USB connection operation, the MCU 14 determines whether or not an audio file exists in the flash memory 12. If the determination result is affirmative, the audio file recorded on the flash memory 12 is erased. It should be noted that the copy allowable audio file is exclude from the object to be erased. After such a file erasure, the MCU 14 executes an USB connection process.

After the USB connection is established, the MCU 14 receives an audio file from the PC 60 through the USB controller 28, and records the received file in the flash memory 12 through the memory 16.

Accordingly, when the USB connection operation is performed in a state that an audio file is recorded on the flash memory 12, an audio file in the flash memory 12 is erased before the USB connection is established with the PC 60, and therefore, it is possible to prevent an unauthorized copy of an audio file.

Furthermore, the erasure process time period is from execution of the USB connection operation to establishment of the USB connection, and therefore, the audio file received from the PC 60 after the USB connection is established continues to exist in the flash memory 12 before a next USB connection operation is performed. Thus, it is possible to appreciate the music content in the flash memory 12.

In addition, the copy allowable audio file continues to exist in the flash memory 12 even after the USB connection operation is performed, and therefore, it is possible to save the trouble of frequently recording the same audio file. Specifically, once-off copy allowable audio file is erased from the PC 60 at a time when it is recorded on the flash memory 12, and therefore, it is possible to prevent the audio file from being erased from the flash memory 12 and being unappreciated.

It should be noted that although the audio file to be reproduced by the IC recorder 10 in this embodiment complies with a WMA format, it may be complied with other formats such as an MP3, etc. It may be possible that audio files in formats different from each other are mixed. An audio file in any formats except for the copy allowable one is erased from the flash memory 12 at a time of a USB connection. Therefore, any MP3 files which are not corresponding to the copy control such as a DRM are an object to be erased.

A description is made by utilizing the IC recorder 10 above. However, the present invention can be applied to any kinds of the content processing apparatuses which are connected to a desired apparatus (PC, recorder/player, digital tuner, mobile phone, handheld terminal, or the like), receives a content from the apparatus, records the received content on the recording medium (flash memory, hard disk, optical disk, or the like), and processes the content recorded on the recording medium.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A content processing apparatus, comprising:
   an establisher for establishing a communication connection with a desired apparatus after a physical connection operation is performed;
   a determiner for determining whether or not a content is recorded on a recording medium;
   an eraser for erasing the content recorded on the recording medium after a physical connection between the content processing apparatus and the desired apparatus has been performed, and before said communication connection is performed;
   a receiver for receiving a content from said desired apparatus after the establishment operation by said establisher is completed; and
   a recorder for recording the content received by said receiver on said recording medium.

2. A content processing apparatus according to claim 1, further comprising a reproducer for reproducing the content recorded on said recording medium.

3. A content processing apparatus according to claim 1, further comprising an eliminator for eliminating a copy allowable content out of the content recorded on said recording medium from an object to be erased by said eraser.

4. A content processing apparatus according to claim 3, wherein said eliminator excludes an encrypted content.

5. A content processing apparatus according to claim 3, wherein said eliminator eliminates a content to which copy control information is added.

6. A content processing apparatus according to claim 1, wherein said recording medium is a built-in type.

7. A content processing method, comprising:
   establishing a communication connection with a desired apparatus after a physical connection is performed;
   determining whether or not a content is recorded on a recording medium;
   erasing the content recorded on the recording medium after a physical connection between the content processing apparatus and the desired apparatus has been performed, and before said communication connection is performed;

receiving a content from said desired apparatus after the communication connection is completed; and recording the content received on said recording medium.

8. The content processing method according to claim 7, further comprising reproducing the content recorded on said recording medium.

9. The content processing method according to claim 7, further comprising eliminating a copy allowable content out of the content recorded on said recording medium from an object to be erased.

10. A content processing method according to claim 9, wherein said elimination excludes encrypted content.

11. A content processing method according to claim 9, wherein said elimination eliminates a content to which copy control information is added.

12. A content processing method according to claim 7, wherein said recording medium is a built-in type.

13. A content processing apparatus, comprising:

a connection controller establishing a communication connection with a desired apparatus after a physical connection operation is performed;

a controller determining whether or not a content is recorded on a recording medium;

a memory erasing the content recorded on the recording medium after a physical connection between the content processing apparatus and the desired apparatus has been performed, and before said communication connection is performed; wherein a communication terminal and said connection controller receive a content from said desired apparatus after the communication connection is completed; and said memory records the content received by said receiver on said recording medium.

14. The content processing apparatus according to claim 13, further comprising a digital signal processing unit and a decoder which reproduce the content recorded on said recording medium.

15. The content processing apparatus according to claim 13, wherein said memory eliminates a copy allowable content out of the content recorded on said recording medium from an object to be erased.

16. The content processing apparatus according to claim 15, wherein said elimination excludes an encrypted content.

17. The content processing apparatus according to claim 15, wherein said elimination eliminates a content to which copy control information is added.

18. A content processing apparatus according to claim 13, wherein said recording medium is a built-in type.

* * * * *